US011667209B2

(12) United States Patent
Kramer et al.

(10) Patent No.: US 11,667,209 B2
(45) Date of Patent: Jun. 6, 2023

(54) DIAGNOSTIC ARRANGEMENT AND DIAGNOSTIC COMMUNICATION FOR A CHARGING PARK

(71) Applicant: Dr. Ing. h.c. F. Porsche Aktiengesellschaft, Stuttgart (DE)

(72) Inventors: Julian Kramer, Stuttgart (DE); Eric Vogel, Stuttgart (DE); Volker Reber, Michelbach/Bilz (DE); Nikolaos Papadopoulos, Stuttgart (DE); Christian Metzger, Tamm (DE); Timo Kaul, Bietigheim-Bissingen (DE); Steve Zander, Marbach am Neckar (DE); Iosif-Norbert Gaier, Oberriexingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 275 days.

(21) Appl. No.: 16/985,465

(22) Filed: Aug. 5, 2020

(65) Prior Publication Data
US 2021/0039517 A1    Feb. 11, 2021

(30) Foreign Application Priority Data
Aug. 5, 2019    (DE) .................... 10 2019 121 086.0

(51) Int. Cl.
*B60L 53/66* (2019.01)
(52) U.S. Cl.
CPC ........... *B60L 53/66* (2019.02); *B60L 2240/72* (2013.01)
(58) Field of Classification Search
CPC ........ B60L 53/56; B60L 53/38; B60L 53/126; B60L 2240/72; B60L 2240/622;
(Continued)

(56) References Cited

U.S. PATENT DOCUMENTS 8,890,475 B1 * 11/2014 Becker ................... B60L 53/68
320/109
2013/0179061 A1    7/2013 Gadh et al.
(Continued)

FOREIGN PATENT DOCUMENTS

DE    10 2014 214 613    1/2016
DE    10 2016 209 192    12/2016
(Continued)

OTHER PUBLICATIONS

German Examination Report dated Jul. 19, 2021.

*Primary Examiner* — Nathaniel R Pelton
(74) *Attorney, Agent, or Firm* — Gerald E. Hespos; Michael J. Porco (57) ABSTRACT

A diagnostic arrangement (200) for a charging park has plural components and a network arrangement. The components include a central gateway (270), at least one control device (280) and a diagnostic database (290) arranged at the central gateway. The diagnostic database contains files or data for diagnosis of the at least one control device. The network arrangement makes a core network available between the components. The at least one control device is connected via the core network to the central gateway. The network arrangement also has a backend server having a backend database with the same diagnostic information as the diagnostic database of the central gateway and is connected to the central gateway. A database extract (220) provides a list (201) of available diagnostics. The at least one control device has apparatus for diagnosis and/or conveying at least one value (208) regarding at least one status of the control device.

9 Claims, 6 Drawing Sheets

(58) Field of Classification Search
CPC . B60L 53/66; H02J 50/10; H02J 50/80; H02J 7/00034; H01M 10/4257; Y02E 60/10; Y02T 90/14; Y02T 90/12; Y02T 90/16; Y02T 10/70; Y02T 10/7072; Y02T 10/72
USPC .......................................................... 320/107
See application file for complete search history.

(56) References Cited

U.S. PATENT DOCUMENTS

| | | | | |
|---|---|---|---|---|
| 2013/0254097 A1* | 9/2013 | Marathe | ................ | G07F 15/005 |
| | | | | 705/35 |
| 2016/0323736 A1* | 11/2016 | Donahue | ................ | H04H 60/23 |
| 2016/0352113 A1 | 12/2016 | Zhao et al. | | |
| 2017/0193716 A1* | 7/2017 | Wittliff, III | ........... | B60L 53/305 |
| 2018/0341476 A1* | 11/2018 | Kitao | ................... | H04L 67/1097 |
| 2019/0043356 A1* | 2/2019 | Su | .......................... | H04W 12/61 |
| 2019/0202315 A1 | 7/2019 | Wilding et al. | | |

FOREIGN PATENT DOCUMENTS

| | | | | |
|---|---|---|---|---|
| DE | 10 2016 005 630 | | 11/2017 | |
| DE | 102018007439 A1 * | | 2/2019 | |
| WO | WO-2019081245 A1 * | | 5/2019 | .............. B60L 53/16 |

\* cited by examiner

DIAGNOSTIC ARRANGEMENT AND DIAGNOSTIC COMMUNICATION FOR A CHARGING PARK

CROSS REFERENCE TO RELATED APPLICATION

This application claims priority under 35 USC 119 to German Patent Appl. No. 10 2019 121 086.0 filed on Aug. 5, 2019, the entire disclosure of which is incorporated herein by reference.

BACKGROUND

Field of the Invention

The invention relates to a diagnostic arrangement for a charging park in which at least one electric vehicle can be charged. A communication or software architecture of the diagnostic arrangement is in particular described. A method for diagnostic communication for the charging park is furthermore described.

Related Art

Similar to a conventional petroleum filling station for automobiles with combustion engines, charging stations offer the facility of charging at least one traction battery of an electric vehicle. A charging current usually is provided through connection of the charging station to a low voltage grid through an isolating transformer or a medium voltage grid of an energy supplier, and is supplied to an electric vehicle parked at the charging station. If there are plural charging stations at such a connection, and/or if plural electric vehicles are charged at this charging station at the same point in time, the necessity emerges of distributing a finite current capacity of the connection to the medium voltage grid as effectively as possible. It may also be relevant to consider a charge level of the traction battery of the respective electric vehicle. Information that arises at different locations in a system consisting of the charging stations and the electric vehicles to be charged must be exchanged, and means of communication must be provided for this exchange.

An exchange of data with control devices of the charging park may be necessary to query information from a control device at a terminal or to influence it. Until now this only has been fully possible at a charging point networked to a backend server, and the data for evaluation are made available in a large HTML file.

DE 10 2016 209 192 A1 describes an electric vehicle charging station where a controller of the charging station and a human/machine interface device communicate. The controller provides a wireless communication to a remote server.

DE 10 2016 005 630 A1 discloses a data processing unit that comprises a first interface to motor vehicles that are to be charged and a second interface to a large number of charging stations. An exchange of information takes place between a respective charging station and the central data processing unit.

DE 10 2014 214 613 A1 discloses an arrangement where communication with an individual charging station is made available to a user in document. The user can exchange data with a control unit in the charging station, for example for identification of the user or for the charging process.

The prior art does not enable a user to query information in respect of neighboring charging stations, i.e. stations connected to an identical medium voltage grid connection. When charging several electric vehicles at such charging stations and interrupting the communication with a backend server that is supervising this, such information can however be significant, since an output of charging current at a medium voltage grid connection is limited. It would, moreover, be important for a user to be able to query diagnostic values from control devices of the charging station, which until now has only been possible centrally through a backend server.

Against this background, it is an object of the invention to provide a diagnostic arrangement for the exchange of information that occurs in connection with a charging process of a traction battery at a charging station. The communication exchange should be possible both during the charging process as well as independently of that, for example related to measured values of a current system status or to a query of an error log. In particular, it is relevant to provide a structure and communication means to perform an exchange of data with further charging stations in addition to the at least one charging station at the one connection to a supply network. Finally, a method should be made available with which diagnostic communication with individual control devices of the diagnostic arrangement is facilitated.

SUMMARY

A diagnostic arrangement is provided for a charging park that comprises a plurality of components and a network arrangement. The components comprise a central gateway, at least one control device and a diagnostic database arranged at the central gateway. The diagnostic database provides at least one file for diagnostics of the at least one control device. The network arrangement further provides a core network between the components. The at least one control device is connected to the central gateway via the core network. In addition, the network arrangement comprises a backend server that comprises a backend database with the same diagnostic information as on the diagnostic database of the central gateway, and that also is connected to the central gateway. A database extract provides a list of available diagnostics or diagnostic functions. The at least one control device comprises means for a diagnosis and/or transmission of at least one value relating to at least one status of the control device. The at least one status is assigned to at least one measured value and/or one configuration parameter and/or one program routine instruction and/or one control device instruction and/or one error message.

The same diagnostic information, stored in the same format, is available to the backend server on the backend database as well as to the central gateway on the diagnostic database each time. It is conceivable that this diagnostic information is present as data in a central configuration file for an overall system formed by the charging park and backend server. The stored data can, for example, be in an XML format. The data of the diagnostic database specifies which states of the at least one control device in general in the charging park can be queried or influenced. A "duration of an updating interval", known as the "heartbeat interval", is thus, for example, stored in the diagnostic database as a configuration parameter. "Timeout" (idle time or downtime) and "location" are further examples. The identification numbers that are respectively associated with the respective queryable states are furthermore specified in the data of the diagnostic database. As an example of this, the identification number 0x10000 is given to a "Control device faulty" error message.

It is conceivable that the diagnostic database of the charging park, which is connected to the core network via the central gateway, hosts or makes available all the files necessary for a querying and/or influencing of at least one control device, or of the particular control device in the case of a plurality of control devices. With its help the central gateway or the backend server can read the at least one status of the at least one control device and convert or display it for a user in "plain text", i.e. readable for a user. It is, however, also conceivable that the diagnostic database only stores the data necessary locally for the at least one control device of the charging park, and that no communication takes place with the backend server in this respect.

The at least one control device that can communicate with the central gateway and the diagnostic database via the core network and/or where diagnostic information is stored locally, may be assigned to at least one of the components selected from a group consisting of at least one cooling module, at least one power electronics module, at least one charging monitor, at least one charging column with a charging cable cooled by the at least one cooling module together with charging cable plug, and may be comprised by the at least one component or integrated therein.

The at least one control device comprises at least one sensor that determine whether a measurable status is present, and thereupon in the positive case to assign a value to this measurable status of the at least one control device, and in the negative case to generate an error message. The at least one sensor may be a temperature sensor that is, for example, located at a charging cable of the charging column. It is conceivable that the error message has as its content information either about a component that is not present, or about a component that is not functioning, or about an interrupted communication, or about a faulty communication.

The diagnostic arrangement also may comprise a frontend module at the central gateway. The frontend module to which the data base extract is assigned may communicate with the components of the charging park via the core network. The frontend module may make selectable menu items relating to the diagnostics available to, for example, a user terminal with the aid of the database extract.

The core network may be an Ethernet-based network in which the central gateway is linked with further components via glass fiber lines and/or copper lines.

The central gateway can be coupled to the backend server via a wireless technology, in particular mobile telephony, via DSL, via Ethernet and/or via WLAN and/or a combination thereof. The wireless technology can here for example be formed by GSM, UMTS or LTE.

The diagnostic arrangement may be configured to realize an exchange of data within the core network without connection of the backend server. A diagnosis or diagnostic query may be enabled on the basis of the values and parameters most recently transmitted and implemented in the charging park, for example for addressing. An HTML tester may be installed fully in the central gateway for this purpose. When connected to a user terminal, the HTML tester can be displayed, so that all of the diagnostic functions are available and selectable. Thus, a diagnosis can be carried out in spite of being without a connection to the backend server.

The invention also relates to a method that uses the diagnostic arrangement described above for diagnostic communication with control devices of a charging park. Each control device separately, or a group of control devices or a subgroup of control devices, are addressed by the central gateway. The addressing is carried out through the formation of a global identification number. A diagnostic identification number is formed for the diagnostic communication. The diagnostic identification number relates to a status of the addressed control device, of the addressed group of control devices, or of the addressed subgroup of control devices.

A particular control device of the charging park can be assigned to at least one of the following components of the charging park: at least one cooling module, at least one power electronics module, at least one charging monitor, at least one charging column with a charging cable including charging cable plug cooled by the at least one cooling module, a transformer station that comprises a monitoring server. The monitoring server can in turn be formed by a central gateway or a charging park management server, also abbreviated (in German) to LMS. In one embodiment, a control device assigned to a respective one of the above-mentioned components can be integrated into the respective control device or comprised by the respective control device. In this sense, not only does the at least one control device represent a component of the charging park, but in addition the components assigned to the at least one control device represent respective components of the charging park.

With the addressing of individual control devices as components of the charging park, and indirectly thereby of the components of the charging park assigned to the respective individual control devices, a unique network address is assigned to each control device through the formation of a global identification number. The global identification number is formed from a series of values related to the charging park. A first value may be related to a group of components assigned to the respective control device, a second value to a type of the components assigned to the respective control device, such as a power electronics module or charging monitor, a third value to a control device number of the respective control device or a group number, and a fourth value to a respective distribution group. This task, that is the formation and assignment of the respective global identification number, is carried out by the central gateway. Each control device in the charging park is furthermore linked with its respective MAC address to its respective IPv6 address. The backend server can be informed by the central gateway of an association between the MAC address and the IPv6 address when the network arrangement of the charging park is initialized. The global identification number on the other hand is formed in the central gateway depending on which components, or which control devices or groups of components comprised thereby, or control devices comprised thereby, are to be addressed. On the basis of this global identification number, however, addressing a dedicated component, or a dedicated control device, or a dedicated group of components, or control devices comprised thereby is possible via the central gateway.

The global identification number is used for addressing individual control devices as components of the charging park, and thereby indirectly also the components of the charging park assigned to the respective individual control devices, the diagnostic identification number relates to individual diagnostic functions. These diagnostic functions relate to the at least one status of the at least one control device, in the case of multiple control devices of a particular control device or a group of control devices. As explained above, a measured value and/or a configuration parameter and/or a program routine instruction and/or a control device instruction and/or an error message is assigned to the at least one status.

The diagnostic function relating to a particular control device can, for example, target a function such as "Switch the light at the charging column on or off" as an actuator test. If the control device assigns a status to a measurable value, for example a temperature related to the charging cable at the charging column, the diagnostic function concerned comprises a determination of this temperature and a return transmission to the central gateway for further processing, i.e. conversion into plain text and display at a user terminal.

A group of control devices can, for example, comprise all the control devices of a cooling group or of a charging point. This can for example include control devices of a cooling module, a pair of power electronics modules, a pair of charging monitors and a pair of charging columns. In this example, the control devices of the two charging monitors would then, for example, form a subgroup.

Through a design of a diagnostic arrangement according to the invention, and by means of form of embodiment of the method according to the invention, each control device, or a group thereof, is in communicative connection with the central gateway. A diagnosis or a measured value diagnosis, under the control of and coordinated by the central gateway, of groups of control devices, subgroups thereof or even individual control devices is thereby advantageously enabled. In the prior art, this is only known for all the control devices of a charging station networked to the backend server, which until now was addressed alone as the charging point, wherein diagnostic data usually have to be read from a single, large HTML file. A narrowing of the diagnosis is furthermore possible through the architecture described, whereas until now the backend server could only initiate a blanket, imprecisely limitable diagnosis.

In the context of the present disclosure, a communicative connection is to be understood as a connection via which signals/data can be transmitted and/or received. A communicative connection here comprises at least one physical interface, an electronic interface or a data interface, wherein a communicative connection can also comprise combinations of these interfaces. Signals/data can be transmitted over a communicative interface between mutually connected units such as here the central gateway and a respective control device, directly or indirectly via one or a plurality of intermediate connected units such as, for example, a processor or the like. Logical and/or physical channels can be used in the communicative connection.

In one embodiment of the method, a data transfer message based on the Open Charge Point Protocol standard or on the Unified Diagnostic Services standard is created for diagnostic communication. The Open Charge Point Protocol standard known from the prior art is a free, universal, application protocol that standardizes the communication between charging stations for electric vehicles and a central administration system. As a part of the method according to the invention, the data transfer message is formed of a message identification number that contains the diagnostic request, of the diagnostic identification number and of the global identification number.

In a further form of embodiment of the method, the diagnostic communication is realized by means of the respective components, in particular of the WebSockets, i.e. web-based program interfaces, assigned to the respective control devices. The central gateway employs a first WebSocket for communication with the backend server, and then also a dedicated WebSocket assigned to each component of the charging park that is in communicative connection with the central gateway. While it is true that individual logic runs on each component of the charging park, in particular on each control device, the connection to the backend server must however necessarily take place via the central gateway or the respective WebSocket that is stored there. The central gateway accordingly acts very much as a router with respect to the backend server for the communication of the backend server with the individual components of the charging park. The WebSockets stored in the central gateway for the individual components of the charging park represent, as it were, a simulation or a virtual representation of the respective components of the charging park with respect to the backend server. Communication with the backend server is accordingly realized for various virtual WebSockets, wherein the backend server only addresses one IP address, namely that of the central gateway.

Further advantages and embodiments of the invention emerge from the description and the attached drawings.

It is clear that the above-named features, and those still to be explained below, can not only be applied in the combination given in each case, but also in other combinations or alone, without going beyond the scope of the present invention.

DETAILED DESCRIPTION

Figure 1:
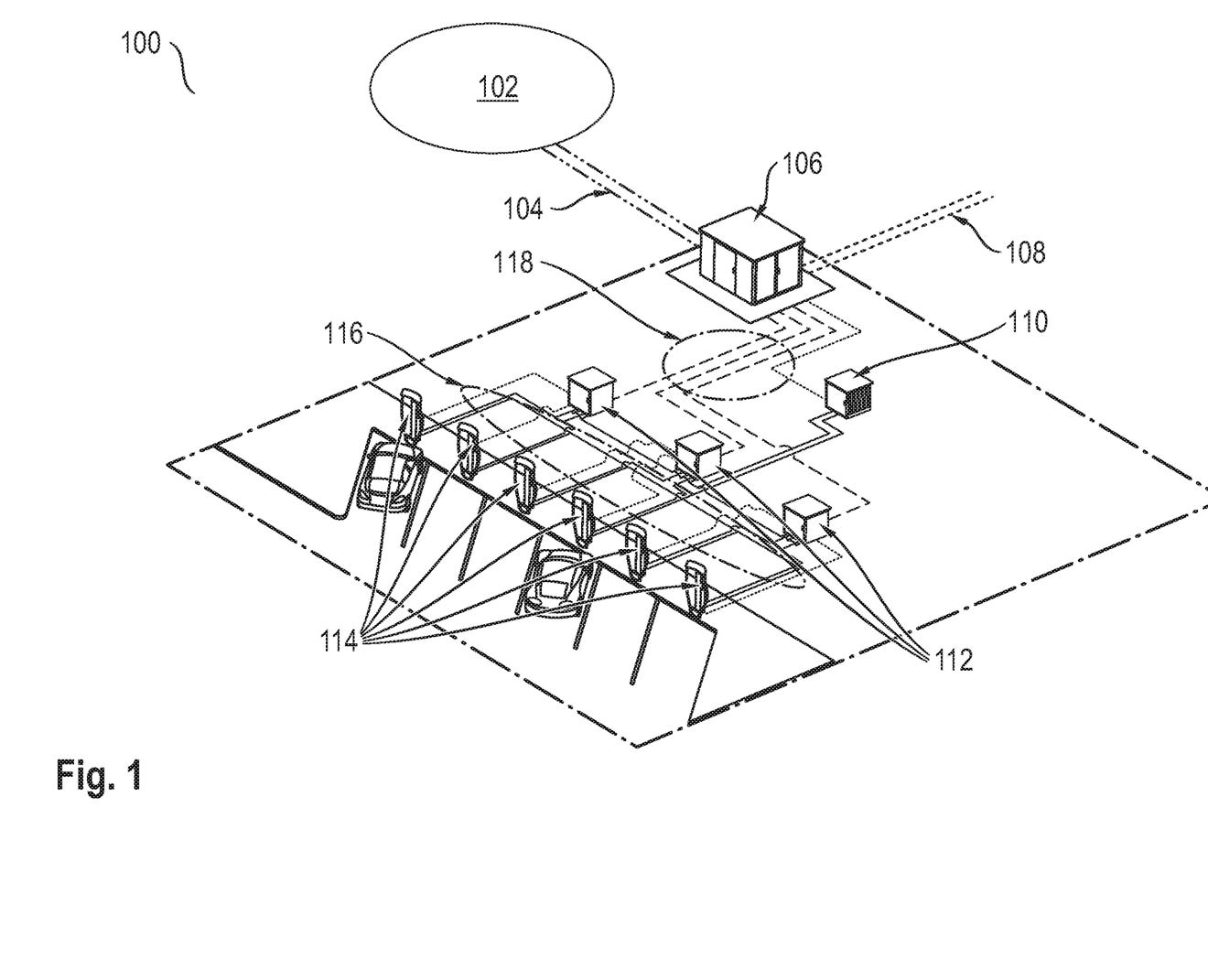
FIG. 1 is a schematic overview of the charging park according to an embodiment of the diagnostic arrangement according to the invention.

A schematic overview of a charging park 100 according to an embodiment of the diagnostic arrangement according to the invention is shown in FIG. 1. A central gateway is located, together with a diagnostic database assigned to it, in a transformer station 106, and communicates from there via a data connection with a backend server 102. The transformer station 106 is connected via electrical lines 108 to a supply grid of, for example, an energy provider. Described as a tree topology, starting from the central gateway in the transformer station 106, which corresponds to a root, branches 118 are formed to the components PowerBox 112, three of which are present here, and CoolingBox 110. Two charging columns 114, each with a charging cable, are assigned as leaves to each PowerBox 112. Branches additionally go from the CoolingBox 110 to the heat-generating PowerBoxes 112, and to the charging columns 114 with the charging cables to be cooled.

Figure 2:
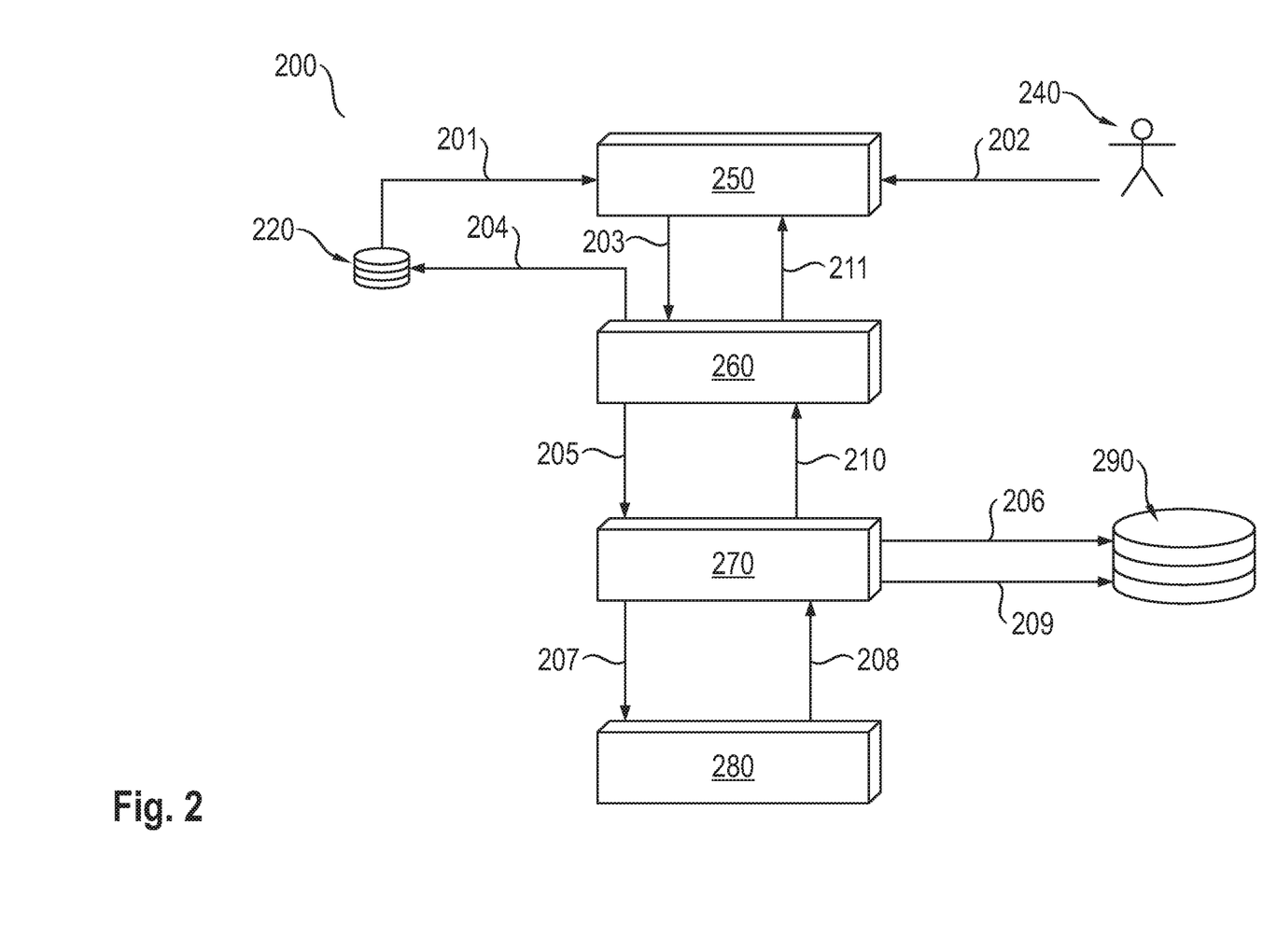
FIG. 2 schematically shows a diagnostic communication according to an embodiment of the method according to the invention that is carried out on an embodiment of the diagnostic arrangement according to the invention.

A diagnostic communication according to one form of embodiment of the method according to the invention, executed on an embodiment of the diagnostic arrangement 200 according to the invention, is shown schematically in FIG. 2. In a first step 201, a database extract 220 that is a subset of the diagnostic database 290 provides a list of selectable menu items with diagnostic queries to a frontend module 250 of the central gateway 270, which provides a visual display of the list at a user terminal for a user 240. The frontend module 250 refers here to a processing module, close to the user, for complex software running in the background (in this case a charging park controller running on the central gateway 270). In a second step 202, the user 240 selects a menu item that is communicated in a third step 203 from the frontend module 250 to a backend module 260. The backend module 260 refers here to the central gateway 270 or to the processing module, close to the charging park management server, for the complex software running in the background. In a fourth step 204 the backend module 260 now determines a diagnostic identification number in accordance with the database extract 220 for the diagnostic query selected by the user 240. In a fifth step 205, an Open Charge Point Protocol message, in short the OCPP message, is formed from the diagnostic query, the diagnostic identification number and a global identification number, and transmitted by the backend module 260 to the central gateway 270. In a sixth step 206, the central gateway 270 requests files stored under the diagnostic identification number in a diagnostic database 290 assigned to the central gateway 270 and assembles from this a diagnostic request to a control device 280 in a seventh step 207. In an eighth step 208, the control device 280 reports a diagnostic response back to the central gateway 270. In a ninth step 209, the central gateway 270 obtains information from the diagnostic database 290 for conversion of the diagnostic response into plain text, and transmits this in a tenth step 210 as part of an OCPP message to the backend module 260. In an eleventh step 211, the backend module 260 transmits the most recent status of the originally selected diagnostic request to the frontend module 250 which displays a result at the terminal for the user 240.

Figure 3:
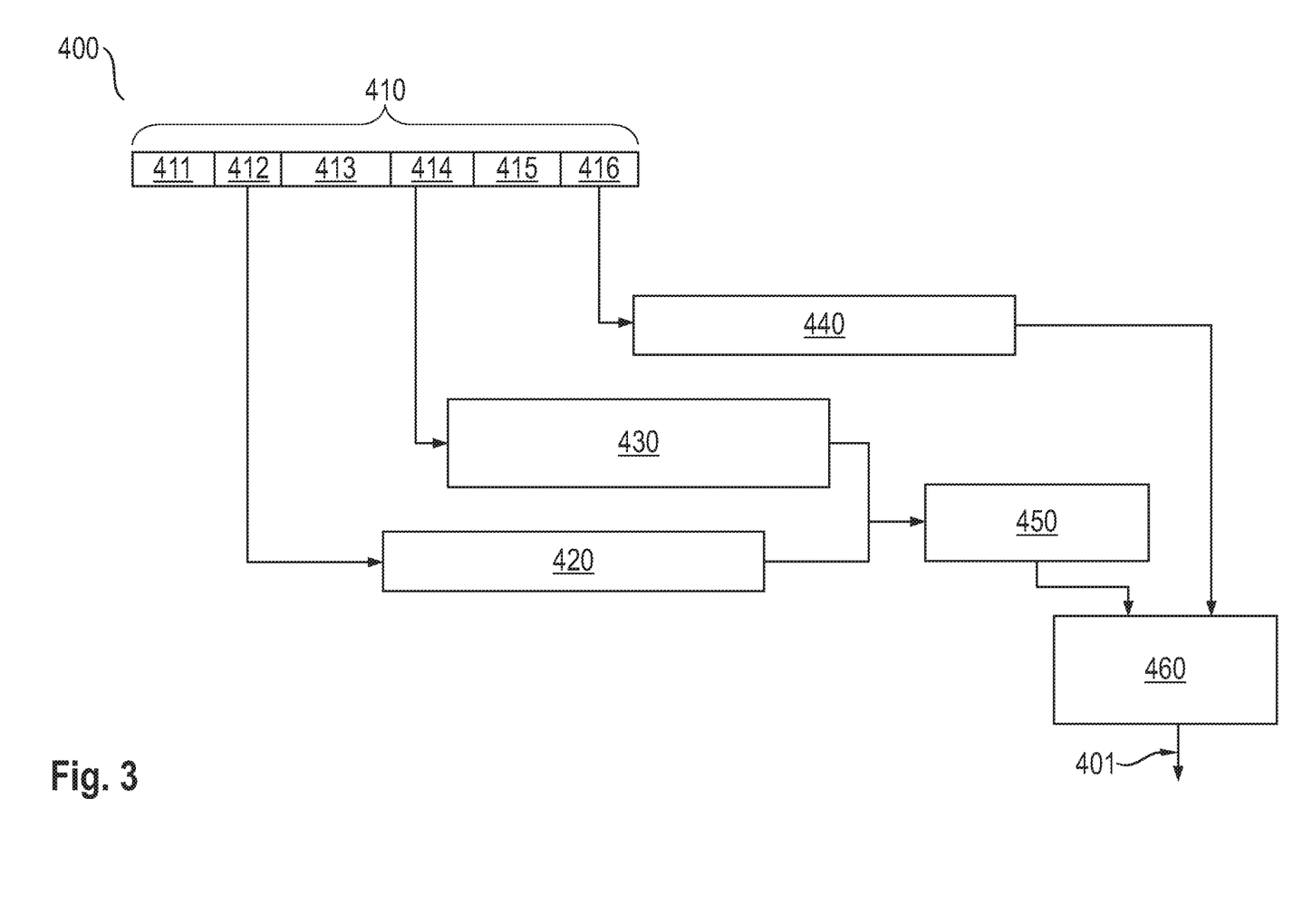
FIG. 3 schematically shows a structure of a data transfer OCPP message according to an embodiment of the invention.

A structure 400 of a data transfer OCPP message 410 according to a form of embodiment of the method according to the invention is shown schematically in FIG. 3. The data transfer OCPP message 410 is composed of three blocks 411, 412 and 413, 414 and 415, 416. The first block 411, 412 contains a "message identification number" identifier 411 with a value of 412. The second block 413, 414 contains a "data" list 413 with at least one queried measurement 414. The third block 415, 416 contains a "global identification number" identifier 415 with a value of 416.

A possible data transfer OCPP message 410 is composed below on the basis of the "Temperature measurement at control device 0xF01" example: A value 412 of "9", which corresponds to a "Read selected measurements" menu item, is assigned in 420 to the message identification number or service identification number 411. On the basis of a Unified Diagnostic Services (UDS) standard, this should correspond to a diagnostic service 0x22, that must be transmitted from the central gateway to the respective control device. In the second block 413, 414, in 430, the "temperature" should be determined out of a possible "data" list 413 of queried measurements 414, whose diagnostic identification number must be determined from the central gateway, and is received as 0x1001. From the two values received in 420 and 430, a diagnostic query is prepared in 450 which results for the example from the service identification number 0x22 and the diagnostic identification number 0x1001 in a number 0x22 10 01 to be transmitted as the diagnostic query. The third block 415, 416 finally contains the global identification number that determines the control devices to which the diagnostic request is sent. A protocol data unit identification number, known for short as PDUID, which comprises the necessary information, is prepared for this purpose, in this example having the value of 0x0aaaaF01, wherein "aaaa" is determined in accordance with the type and identification number of the respective control device. Thus in 460 the diagnostic query is transmitted by means of the Transmission Control Protocol 401, known for short as TCP, as follows: PDUID: 0x0aaaaF01, length 3, message 0x22 10 01.

Figure 4:
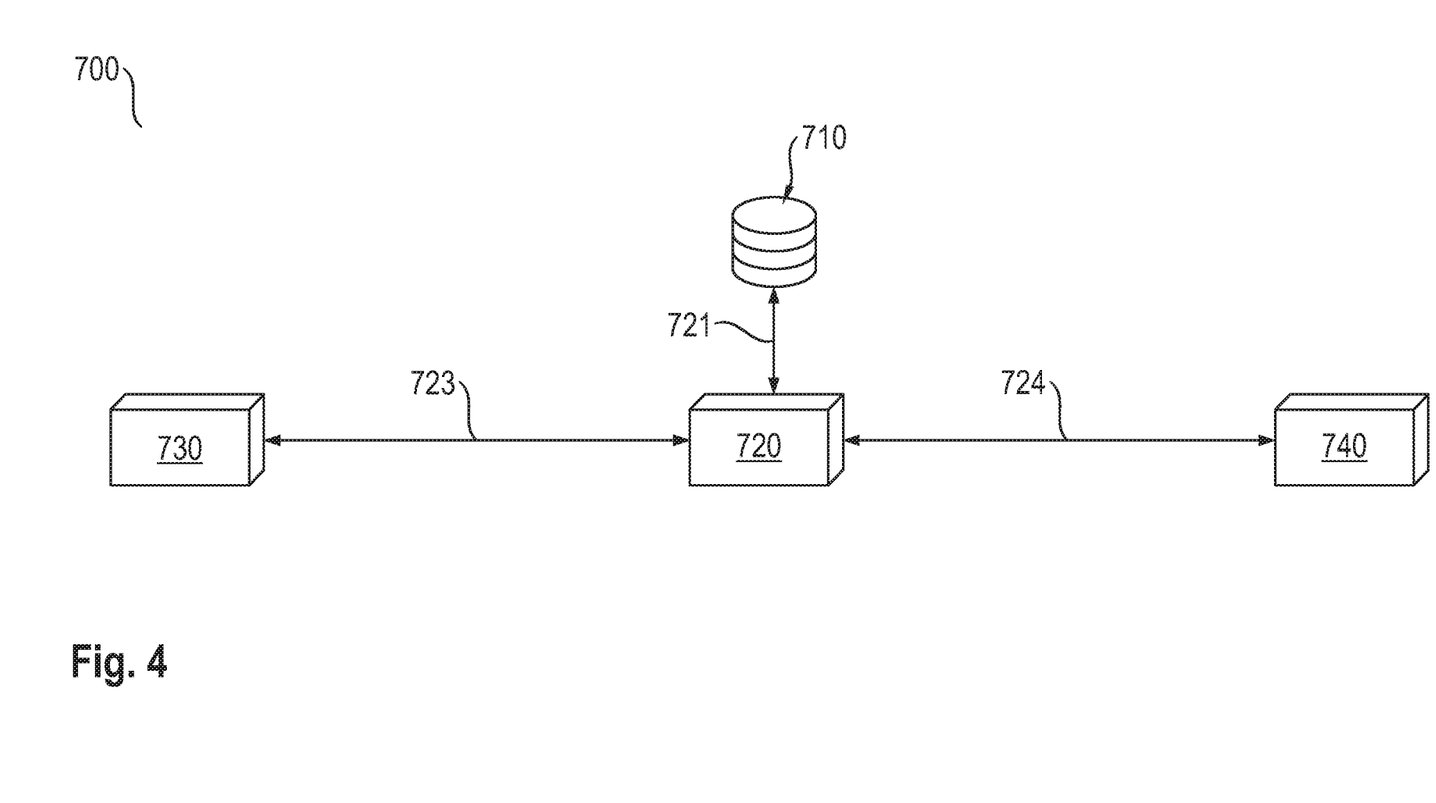
FIG. 4 schematically shows a further example of the diagnostic communication according to the invention.

FIG. 4 shows schematically a further example 700 of the diagnostic communication according to a form of embodiment of the method according to the invention. The central gateway 720 is in backend communication 723 with the backend module 730 by means of the Open Charge Point Protocol, wherein a diagnostic response containing a measured value is only exchanged as a physical value, i.e. in plain text. A diagnostic database 710 is assigned to the central gateway 720, with which the central gateway 720 communicates 721 directly. The central gateway 720 finally operates a diagnostic communication 724 with a respective control device 740 by means of the Transfer Control Protocol, wherein this only contains encoded values.

A diagnostic query regarding a temperature at a control device is illustrated as an example: The backend server 730 first requests a "temperature measurement". On the basis of the UDS standard, the central gateway 720 converts the "temperature measurement" diagnostic query into a message identification number 0x22 (for the "Measurement at control device" service) and a diagnostic identification number, for example 0x1001 (for "temperature"), whereupon "0x22 10 01" is transmitted from the central gateway 720 to the control device 740. The control device 740 processes the query and returns, for example, the response "0x62 10 00 03 43". This corresponds to the encoded value 835 (0x343=3*256+4*16+3=768+64+3=835). The central gateway 720 receives the data (0x343) and converts it to a value in plain text. In this example, the temperature would be converted using the formula y=x*0.1-50, wherein x is a raw value transmitted from the control device 740 and y is the value in plain text that is then forwarded from the central gateway 720 to the backend module 730. As a result we obtain: y=835*0.1-50=23.5 degrees Celsius. The central gateway 720 thus transmits "23.5° C." as a string to the backend module 730, which makes this visually available for the user on a display unit, if relevant by way of the frontend module known from FIG. 2 (with reference sign there of 250).

Figure 5:
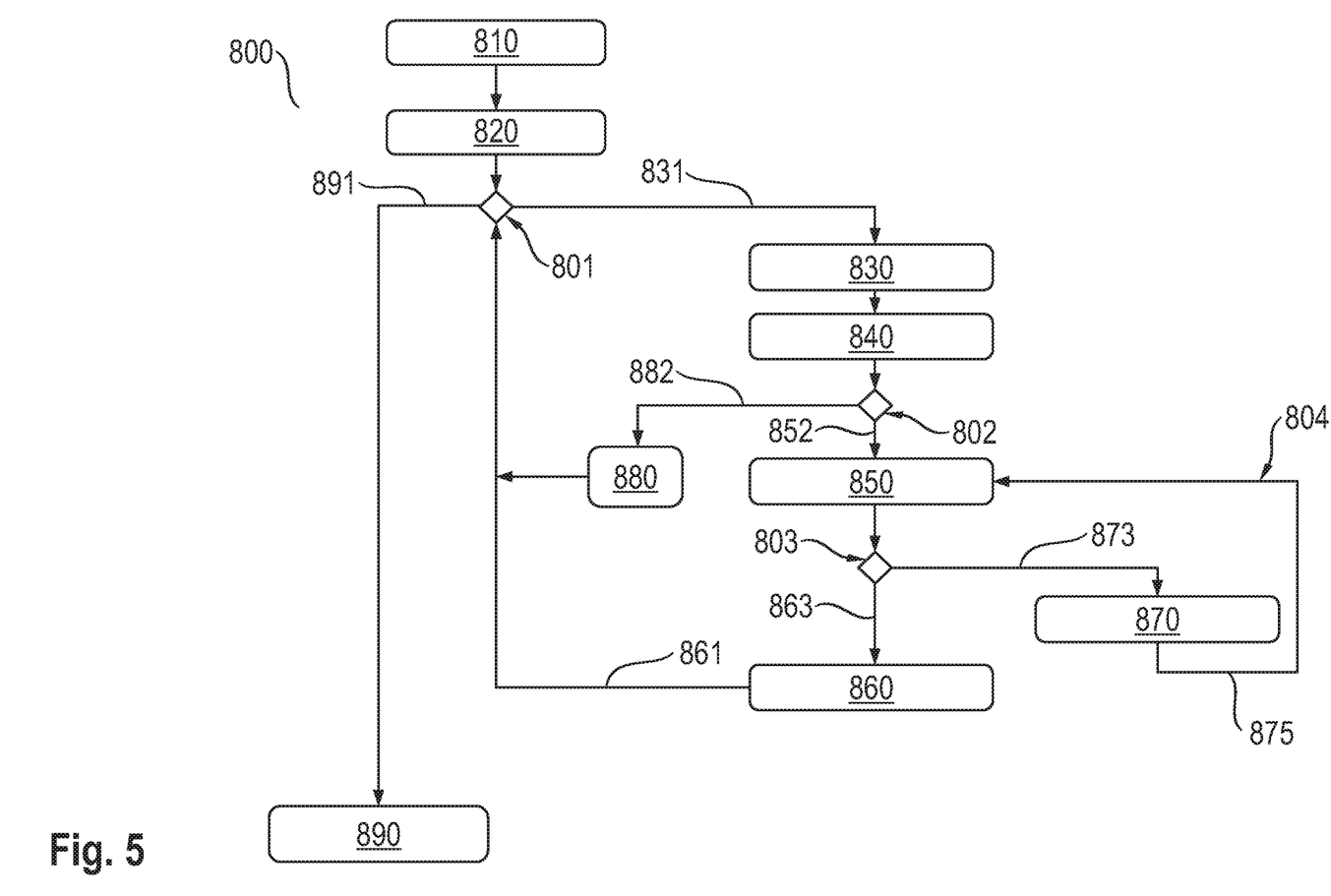
FIG. 5 schematically shows, on the basis of a flow diagram, a determination of a service identification number according to the invention.

A determination of a service identification number according to a form of embodiment of the method according to the invention is shown schematically in FIG. 5 on the basis of a flow diagram, 800. To begin with, a request to determine the service identification number takes place in 810. In 820, a search is made in a database for an entry that finally should be found in a global database. A branch is taken in 801 depending on the outcome of the search in 820. If no further entries could be found 831, then a parameter length is determined in 830 from which an encoded value is obtained. A parameter type is thereupon fetched from the database in 840. A branch is taken in 802 according to whether a constant value 882 is involved, whereby the encoded value is used 880 as the result of the determination (and then returns to 801, or whether the parameter references a simple or complex type 852, and the referenced type of the parameter is determined in 850). A decision is made in 803 as to whether the referenced type determined is a complex type 873, i.e. is a table, a structure or a field, or whether it is a simple type 863, i.e. an integer, a string, a text table or a byte-series. In the case of the complex type 873, then in 870 the encoded value is used in order to determine a subtype, and then, via 875, to again in 850 determine the referenced type of the parameter. This process 804 should be repeated until all the sub parameters of a parameter are determined as simple types. If this is finally the case, then in 860 the encoded value is converted into a physical value. The process thus passes via 861 to the next parameter, and a branch taken in 801 depending on the presence of further parameters. If no more further parameters are present 891, then the service determination is ended in 890.

Figure 6:
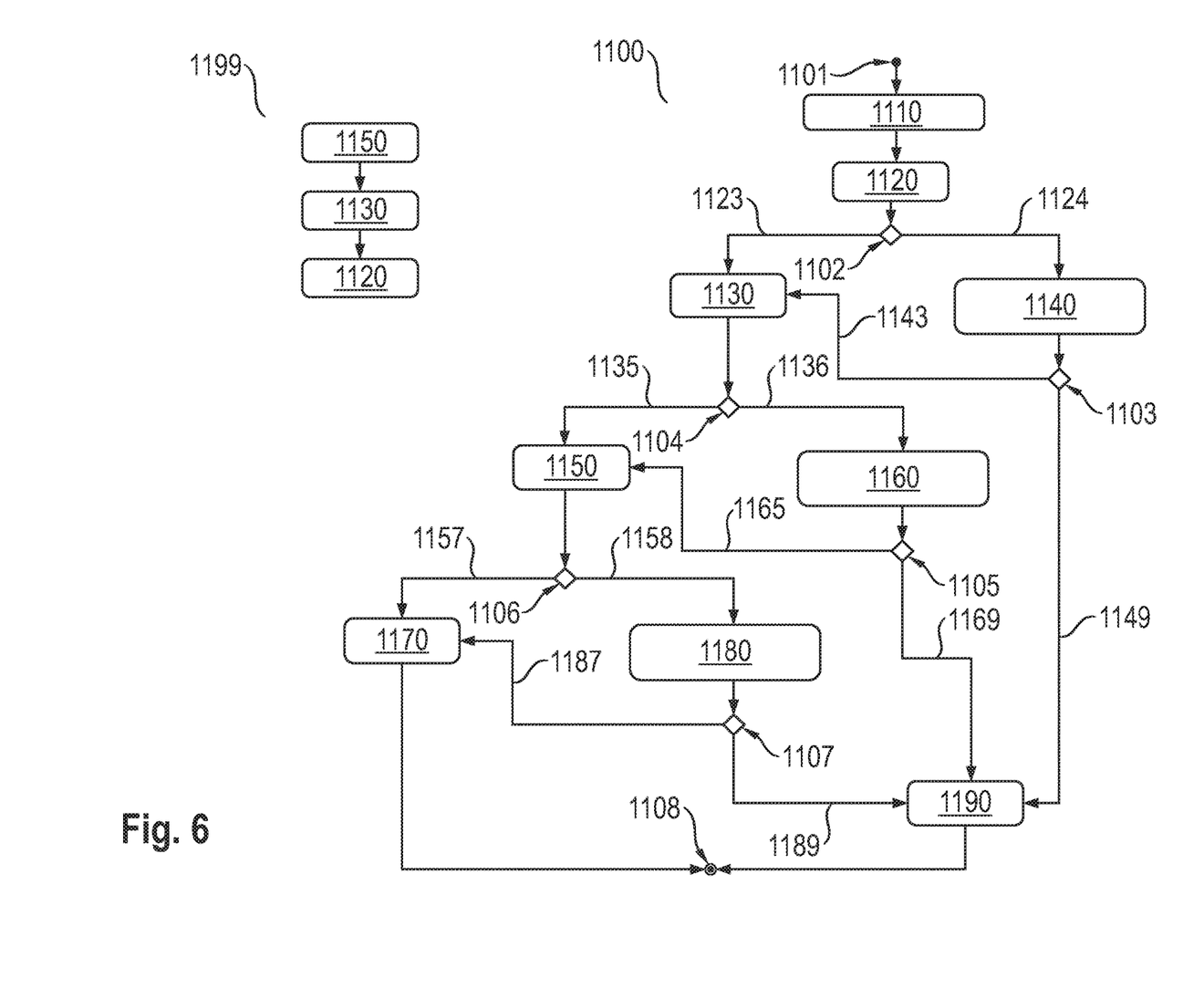
FIG. 6 schematically shows, on the basis of a flow diagram, a type determination of a component of the charging park according to the invention.

A type determination of a diagnostic parameter for a control device of the charging park according to a form of embodiment of the method according to the invention is shown schematically in FIG. 6 on the basis of a flow diagram 1100. The flow diagram 1100 will run on the central gateway after the user has made a menu selection, and a task is to be formulated for a component type and/or function type, in particular control device type, desired by the user or the menu selection. A control device type can here be defined or given, for example, by the assignment of the control device to a specific superordinate component such as, for example, a cooling module, a power electronics module or to a charging monitor. After the start 1101, the request 1110 is made to obtain a type name from a parameter or a complex type. A search takes place for the type in a control device-specific database 1120, and a branch is made in 1102, depending on the outcome of the search. If the type is not found 1123, a search is made again in a global control device database 1130. If, however, the type is found 1124 in 1120, it is present as an encoded value. In 1140 it is then determined whether the encoded value can be interpreted, i.e. whether there are interpretation details available for the encoded value, i.e., for example, whether a diagnostic identification number has been found. In 1103 a branch is taken to 1143 if there are no interpretation details, and a search should be made for the type in the global regulator database 1130. Depending on the outcome of the search for the type in the global control device database 1130, a branch is taken in 1104. If the type was not found 1135, then the type is searched for in a global diagnostic database 1150. If the type was found 1136 in 1130 (and is present as an encoded value), then in 1160 a search is made as to whether the encoded value can be interpreted, that is whether interpretation details exist for the encoded value (for example whether the diagnostic identification number is found). In 1105 a branch is taken to 1165 if there are no interpretation details, and a search should be made for the type in the global diagnostic database 1150. Depending on the outcome of the search for the type in the global diagnostic database 1150, a branch is taken in 1106. If the type was not found 1157, then a report that there is an interpretation error is given in 1170. If the type was however found 1158, then in 1180 a search is made as to whether the encoded value can be interpreted, that is whether interpretation details exist for the encoded value (for example whether the diagnostic identification number has been found). If that is not the case, then in 1107 a branch is taken to 1187, and the encoded type (without interpretation details) is reported in 1170. However, if the encoded value could be interpreted in 1140 or in 1160 or in 1180, then, via 1149, 1169 or 1189 respectively the determination 1190 is reached that the type and the encoded value of the type could be interpreted in the respective database. The flow diagram ends at 1108. The hierarchy of the respective databases is illustrated in the small diagram 1199: the control device-specific database 1120 forms a subset of the global control device database 1130, which in turn forms a subset of the global diagnostic database 1150.

What is claimed is:

1. A diagnostic arrangement for a charging park, wherein the charging park comprises a plurality of components and a network arrangement, wherein the components comprise a central gateway, at least two control devices and a diagnostic database arranged at the central gateway, wherein the diagnostic database contains diagnostic information and provides at least one file for diagnosis of the at least two control devices, wherein the network arrangement makes a core network available, wherein at least the at least two control devices is connected via the core network to the central gateway, wherein the network arrangement additionally comprises a backend server that comprises a backend database with the same diagnostic information as in the diagnostic database of the central gateway, and is also connected to the central gateway, wherein the central gateway additionally includes a front end module, wherein a database extract that provides a list of available diagnostics to a user terminal is assigned to the frontend module, the frontend module is configured to communicate via the core network with the components of the charging park such that an exchange of data within the core network is realized without connection of the backend server, wherein each of the at least two control devices comprises means for diagnosis and/or conveying at least one value regarding at least one status of the control device, and wherein the at least one status is assigned to at least one measured value and/or a configuration parameter and/or a program routine instruction and/or a control device instruction and/or an error message.

2. The diagnostic arrangement of claim 1, wherein the components of the charging park that communicate via the core network comprise, in addition to the central gateway and the diagnostic database, at least one component selected from a group consisting of at least one cooling module, at least one power electronics module, at least one charging monitor, at least one charging column with a charging cable cooled by the at least one cooling module complete with charging cable plug, wherein at least one control device is assigned respectively to each of the components of the group.

3. The diagnostic arrangement of claim 1, wherein each of the at least two control devices comprises at least one sensor that is operative to assign a value to a measurable status.

4. The diagnostic arrangement of claim 1, wherein the core network is an Ethernet-based network in which the central gateway is linked with further components via respective glass fiber lines and/or copper lines.

5. The diagnostic arrangement of claim 1, wherein the central gateway is connected to the backend server via mobile telephony, via DSL, via Ethernet and/or via WLAN and/or a combination thereof.

6. A method for diagnostic communication of control devices in the charging park making use of the diagnostic arrangement of claim 1, comprising addressing either each control device individually, or control devices, or a subgroup of control devices by the central gateway carrying out through the formation of a global identification number and wherein a diagnostic identification number is formed for the diagnostic communication, in which the diagnostic identification number relates to a status of the addressed control device, of the addressed group of control devices or of the addressed subgroup of control devices.

7. The method of claim 6 in which a data transfer message based on the Unified Diagnostic Services standard is formed for diagnostic communication.

8. The method of claim 6 in which the diagnostic communication is realized by means of WebSockets assigned to the respective control devices.

9. The method of claim 6 in which a data transfer message based on the Open Charge Point Protocol standard is formed for diagnostic communication.

* * * * *